United States Patent [19]

Wittler

[11] Patent Number: 5,305,567

[45] Date of Patent: * Apr. 26, 1994

[54] INTERLOCKING STRUCTURAL MEMBERS WITH EDGE CONNECTORS

[76] Inventor: Waldemar E. Wittler, 25 Harbourside Rd., North Quincy, Mass. 02171

[ * ] Notice: The portion of the term of this patent subsequent to Mar. 24, 2009 has been disclaimed.

[21] Appl. No.: 855,440

[22] Filed: Mar. 23, 1992

Related U.S. Application Data

[63] Continuation-in-part of Ser. No. 630,067, Dec. 19, 1990, Pat. No. 5,097,643, and a continuation-in-part of Ser. No. 695,592, May 3, 1991, abandoned.

[51] Int. Cl.$^5$ .......................... E04H 3/00; E04C 2/10; A47G 5/00
[52] U.S. Cl. .................. 52/238.1; 52/243.1; 52/586.1; 160/135
[58] Field of Search .............. 52/136, 137, 292, 295, 52/396, 477, 698, 258, 562, 169.7, 169.8, 238.1, 211, 212, 213, 810, 239, 656, 475, 588, 241, 242, 243; 160/135, 351, 236

[56] References Cited

U.S. PATENT DOCUMENTS

| | | | |
|---|---|---|---|
| 2,228,363 | 1/1941 | Pinney | 189/34 |
| 2,414,060 | 1/1947 | Rausch | 20/4 |
| 2,948,364 | 8/1960 | Cooper | 189/34 |
| 3,009,549 | 11/1961 | Miller | 189/34 |
| 3,397,496 | 8/1968 | Sohns | 52/286 |
| 3,509,673 | 5/1970 | Witkosky et al. | 52/242 |
| 3,608,260 | 9/1971 | Eckel et al. | 52/284 |
| 3,695,330 | 10/1972 | Hasbrouck | 52/126 |
| 3,859,000 | 1/1975 | Webster | 404/41 |
| 3,974,616 | 8/1976 | Beckley | 52/738 |
| 4,128,983 | 12/1978 | Matsubara | 52/731 |
| 4,151,691 | 5/1979 | Wendt | 52/242 |
| 4,186,539 | 2/1980 | Harmon et al. | 52/580 |
| 4,344,475 | 8/1982 | Frey | 160/135 |
| 4,438,605 | 3/1984 | DeLucia | 52/71 |
| 4,744,185 | 5/1988 | Lamberet et al. | 52/309 |
| 4,765,107 | 8/1988 | Ting | 52/235 |
| 4,828,005 | 3/1989 | Notley | 160/351 |
| 4,831,804 | 5/1989 | Sayer | 52/475 |
| 4,879,854 | 11/1989 | Handler | 52/DIG. 13 |
| 4,905,428 | 3/1990 | Sykes | 52/126 |

FOREIGN PATENT DOCUMENTS

| | | | |
|---|---|---|---|
| 1249410 | 1/1989 | Canada | 20/33.4 |
| 2802151 | 7/1979 | Fed. Rep. of Germany . | |
| 1532671 | 7/1968 | France . | |
| 542966 | 11/1973 | Switzerland . | |
| 1445687 | 8/1973 | United Kingdom . | |
| 2093085 | 8/1982 | United Kingdom . | |

Primary Examiner—Carl D. Friedman
Assistant Examiner—Kien Nguyen
Attorney, Agent, or Firm—Fish & Richardson

[57] ABSTRACT

A frame system and frame members in which the frame members have a base, a support wall extending from the base adjacent one edge thereof a tongue extending from the support wall parallel to and spaced from the base, a detent or groove between the free end of the tongue and the other edge of the base, a bend or protrusion connected to the base adjacent the one edge, on the other side of said base from said support wall a tubular structure comprising a center channel and a pocket on each side thereof for receiving an angle member. In an assembled frame, the frame members are joined end to end by angle members in the pockets. Hook and loop features fabric secured respectively to the sides of the pockets and display panels permits simple mounting and changing of panels on the assembled frame.

25 Claims, 12 Drawing Sheets

INTERLOCKING STRUCTURAL MEMBERS WITH EDGE CONNECTORS

BACKGROUND OF THE INVENTION

This is a continuation-in-part of co-pending U.S. application Ser. No. 07/630,067, filed Dec. 9, 1990 now U.S. Pat. No. 5,097,643, and continuation-in-part of Ser. No. 07/695,592, filed May 3, 1991 now abandoned.

This invention relates to interlocking structural members, (e.g., display panels) connected together at their edges.

Portable interlocking structural members such as display panels and room dividers, are frequently held together in the desired arrangement by connectors located along the edge of the panels. It is known to provide connectors consisting of bead and groove conformations in mating interfitting tongue and socket structures, oriented in the plane of the panels. The tongue and socket structures are interconnected by longitudinal movement of the adjacent panels towards each other.

SUMMARY OF THE INVENTION

In one aspect the invention features an edge connector for connecting structural members at their adjacent edges, including a base extending transversely between edges of the base; a support wall integral with the base extending away from the base on one side thereof, the support wall extending generally parallel to the base edges and positioned between the transverse center of the base and one edge of the base; and a tongue integrally connected at one end to the support wall and extending from the support wall to a free end thereof spaced away from the base and positioned between the transverse center of the base and the other edge of the base on the side of the center opposite the one base edge, the tongue and the base defining a recess therebetween to receive the tongue of a mating connector. Preferred embodiments include the following features. The edge connector comprises an elongated extrusion, and the base edges, support wall and tongue extend along the length of the extrusion. The tongue, in section, has parallel walls extending parallel to the base and is spaced from the base a sufficient distance to receive a similarly dimensioned tongue of a mating connector. A protrusion or bead extends from the base recess between the transverse center of the base and the edge of the base near which the support wall is located. The base includes a detent or groove located between the transverse center of the base and the other edge, and preferably between the free end of the tongue and the other edge of the base, and adapted to receive the protrusion of a mating connector.

In one embodiment, the base includes a bracing wall integral with the base and extending from the base between the support wall and one edge of the base, generally parallel with the support wall. Preferably, the bracing wall also includes the protrusion or bead which extends from the end of the bracing wall away from the base; and the base also includes the detent or groove parallel to the bracing wall, positioned adjacent and beyond the free end of the tongue, and adapted to receive a protrusion on the bracing wall of a mating connector In another aspect, the invention features frame members and a frame system for supporting panels and for connecting the frames at their adjacent edges, comprising a plurality of frame members having edge connectors as described, arranged to form a frame, each frame member being attached to at least two other frame members, each frame member having a portion receiving a panel. Panels can be readily removed from the frame and replaced, and panels of any desired material may be easily secured to the frame. Preferably, the frame members are connected by angle members having a pair of angularly disposed legs, and in each frame member in a pocket dimensioned to receive one of the legs of the angle iron. In preferred embodiments, panels are connected to frame members by hook and loop fasteners; the frame members in one embodiment are joined at approximately 90 degree angles; the frame members are connected by a pair of angle members, received by a pair of pockets in each frame member; the pair of angle members are disposed in substantially parallel planes; and a continuous frame member, having a length equal to the total length of the connected frames, is mated with the top frame members in each frame.

Edge connector strips for interlocking structural members that have a tongue oriented parallel to the base of the connector, so that the oppositely oriented tongue of an opposed connector is interlocked between the tongue and the base of the strip, form an easily assembled and disassembled and yet secure connection between adjacent units in a structural member assembly. The orientation of the connector strips on the edge of the structural members with the tongues of the connectors parallel to the structural member edges means that assembly and disassembly of the structural members requires very little maneuvering room.

DESCRIPTION OF THE PREFERRED EMBODIMENTS

A lightweight, sturdy, adaptable display panel system that is easily assembled and disassembled is made of edge protected panels, held together in the desired angular arrangement by extruded plastic connectors secured to the edges of the panels. The panel system is assembled by snapping together or engaging the appropriate connectors in a lateral movement past each other, in a plane perpendicular to the plane of an adjacent panel. To disassemble the panels, the connectors are unlocked by deflection out of the local plane of the assembled system.

Figure 1:
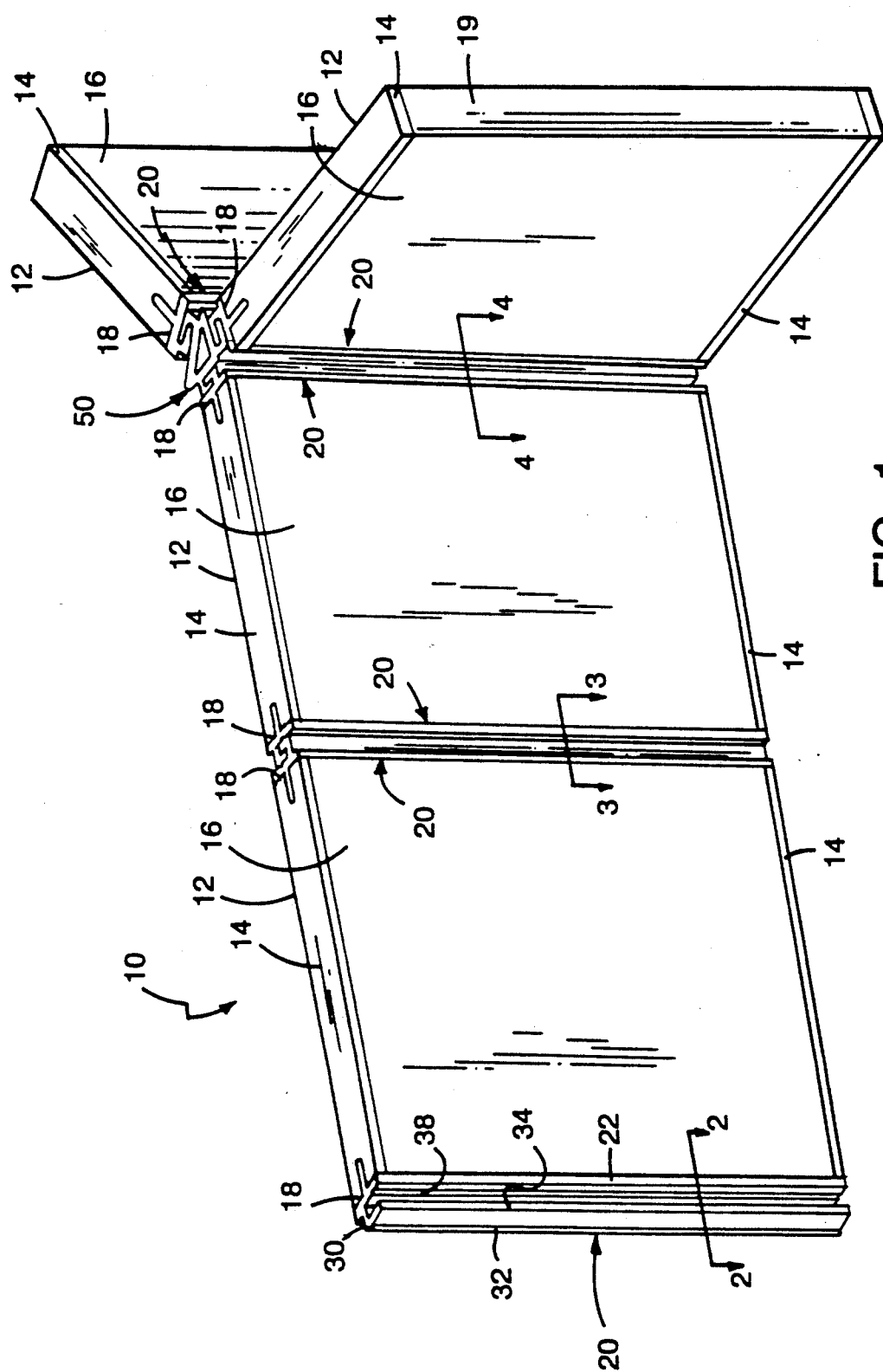
FIG. 1 is a perspective view of a panel system according to the invention.

Referring to FIG. 1, a system of structural members 10 comprises individual insulating foam panels (Branch River, Smithfield, R.I.) 12, typically 8.0' high x 4' wide x 1.5" thick, each having a two pound density expanded styrene styrofoam core, a 0.75" thick protective wood strip 14 top and bottom, and sides 16 laminated with a protective coating of 0.031" paper backed plastic laminate (not shown), the wood strip and the plastic laminate being attached to the foam core with a water-based resin (isoset resin WD3-A322 and hardener CX47, manufactured by Ashland Chemical Co., Columbus, Ohio). At each vertical edge 18 of a panel 12, except for finish end edge 19, is an elongated, high-impact extruded styrene plastic edge connector strip 20, extending substantially the length of the panel edge 18.

Figure 2:
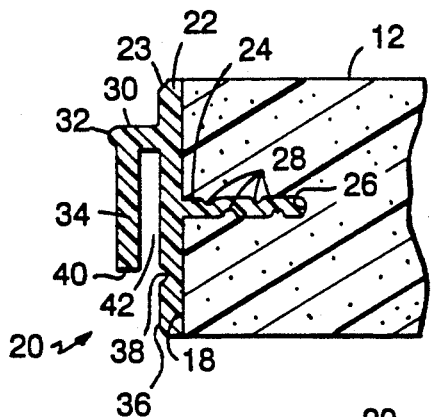
FIG. 2 is a sectional view taken at line 2—2 of FIG. 1.

Referring to FIG. 2, elongated edge connector 20 has a 1.5" wide transverse base 22 extending the full width of a panel edge 18. The corners 23 of the base are chamfered at 45°. Base 22 has an integrally connected central leg 24 extending into a groove 26 in the center of the panel and generally forming a T with the base. Leg 24 contains a plurality of striations or notches 28 for holding an assembly glue compatible with the styrofoam core (e.g., a two part solventless epoxy resin, West System 105 Epoxy Resin, Group B, and Fast Epoxy Hardener 205 or Slow Epoxy Hardener 206, all manufactured by Gougeon Brothers, Inc., Bay City, Mich.). Beads of the glue are applied in the groove 26 and on the panel edges on each side of the groove 26 to securely bind the connector 20 to the panel 12. On the other side of the T an integrally connected short leg or support wall 30 (0.25" long), having a 0.031" high integrally connected protrusion or bead 32 on its end, is positioned between the transverse center of base 22 and one end of the base and extends away from panel edge 18 parallel to the edges of the base 22. Just below bead 32, a 0.125" thick integrally connected tongue 34 extends 0.75" from support wall 30 parallel to base 22, to a free end spaced a short distance beyond the transverse center of the base, the free end of tongue 34 positioned at a distance beyond the transverse center of the base 22 no greater than the distance from the center to the adjacent side of support wall 30, the tongue preferably being centered on the base. The spacing of the tongue from the base thus forms recess 42 between the tongue and the base. The tongue 34 has parallel walls extending parallel to the base 22 and is spaced away from the base 22 a distance approximately equal to its thickness to receive the tongue of a mating connector in the recess between the tongue 34 and base 22. In the surface 36 of base 22 facing towards tongue 34, and just outside the projection of free end 40 of tongue 34 onto base surface 36, i.e., at a distance from the center of the tongue and, in the illustrated embodiment, from the center of the base equal to the distance of the bead from the centers, a 0.031" deep recessed detent or groove 38 extending parallel to wall 30 is provided to receive the bead on the support wall of another connector. The detent or groove 38 is spaced from the transverse center of the base 22 a distance equal to the spacing of bead 32 from the center. The base edges, wall 30, the free end of tongue 34, and detent or groove 38 extend along the length of the extrusion parallel to each other as shown in FIG. 1.

Figure 3A:
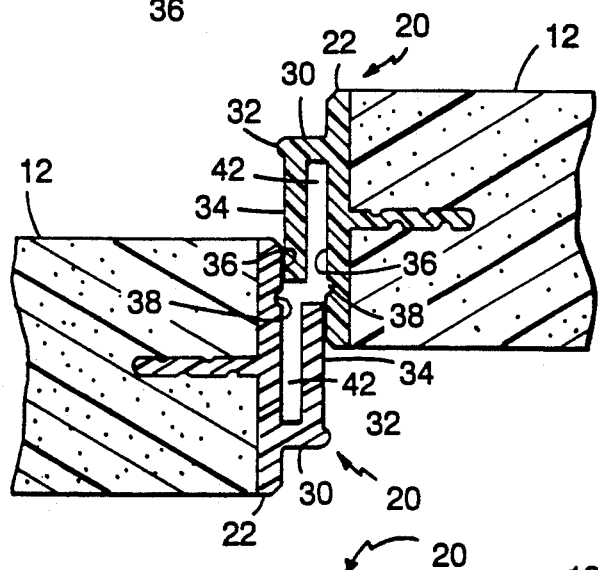
FIG. 3a is a sectional view taken at line 3—3 of FIG. 1 prior to the assembly of two adjacent panels.
Figure 3B:
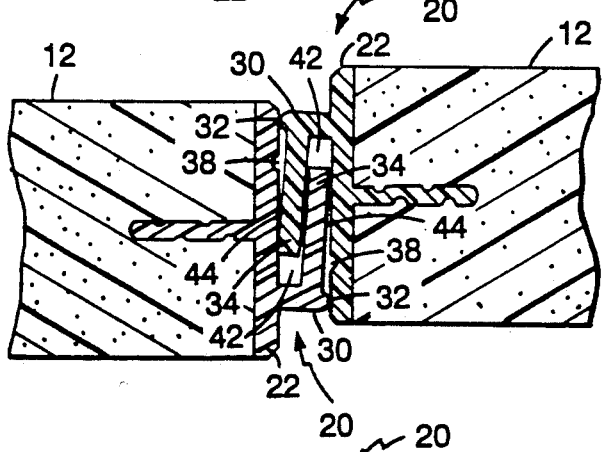
FIG. 3b is a sectional view taken at line 3—3 of FIG. 1 during the assembly of two adjacent panels.
Figure 3C:
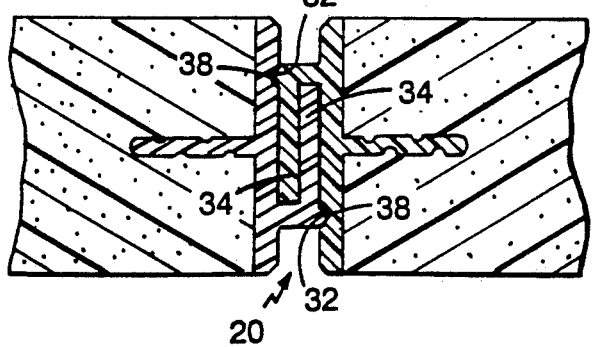
FIG. 3c is a sectional view taken at line 3—3 of FIG. 1 after assembly of two adjacent panels.

When a number of panels 12 are assembled into a system, linearly extending panels are held together by interlocking the identical opposing connector strips 20 on the edges of adjacent panels 12. Referring to FIG. 3a, to connect two panels, each connector tongue 34 is positioned opposite the entrance to recess 42 on the opposing connector. Referring to FIG. 3b, as each tongue 34 is moved laterally along the surface 36 of the opposing connector base, bead 32 is pushed onto surface 36 of base 22, thus forcing the outer surface 44 of each tongue 34 away from contact with surface 36 of the opposing base and deflecting each tongue 34 out of a plane parallel to the bases of the two connector strips 20. Finally, referring to FIG. 3c, as each tongue 34 is moved further into recess 42 of the opposing connector strip, each bead 32 reaches and snaps into groove 38 in the base of the opposing connector, locking the connectors and adjacent panels together.

Figure 4:
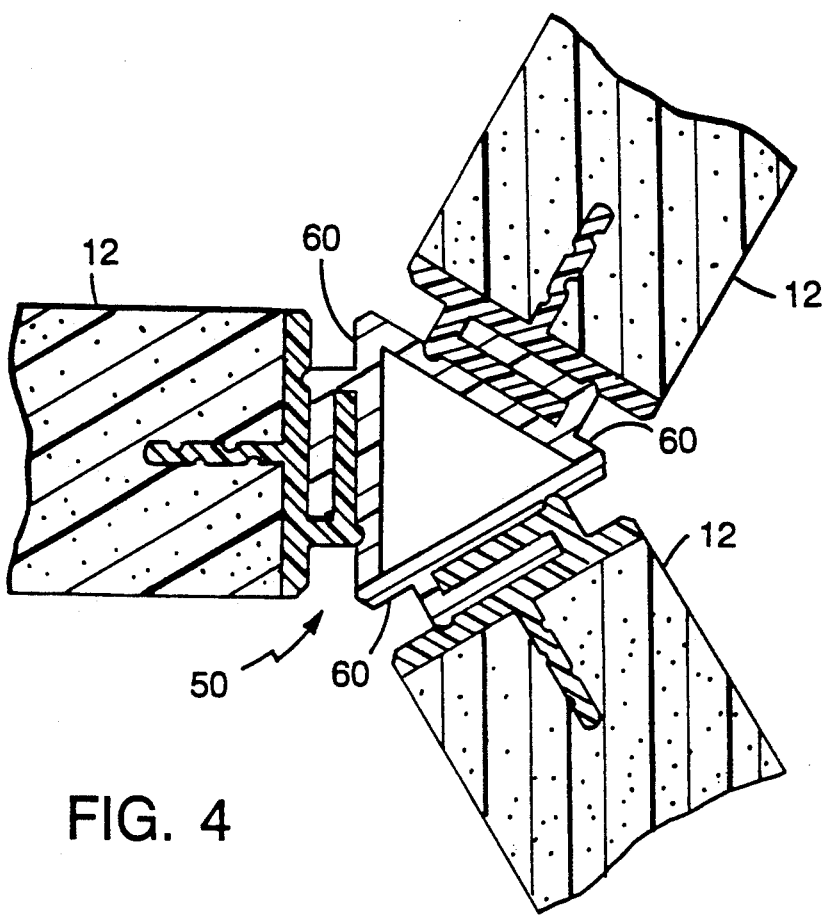
FIG. 4 is a sectional view taken at line 4—4 of FIG. 1.

Referring again to FIG. 1, numerous angular arrangements of various panels 12 are possible. For example, it may be desirable to connect three panels together in the form of a Y. For this application, a special connector post is used. Referring to FIG. 4, connector post 50 consists of three connectors 60, identical in dimension to connector 20 but lacking central leg 24. The individual connectors 60 are integrally connected at the edges of their bases to form an equilateral triangle. Connector post 50 is joined in sequence to three individual panels 12, using the same procedure as described before, to form the Y arrangement.

Figure 5:
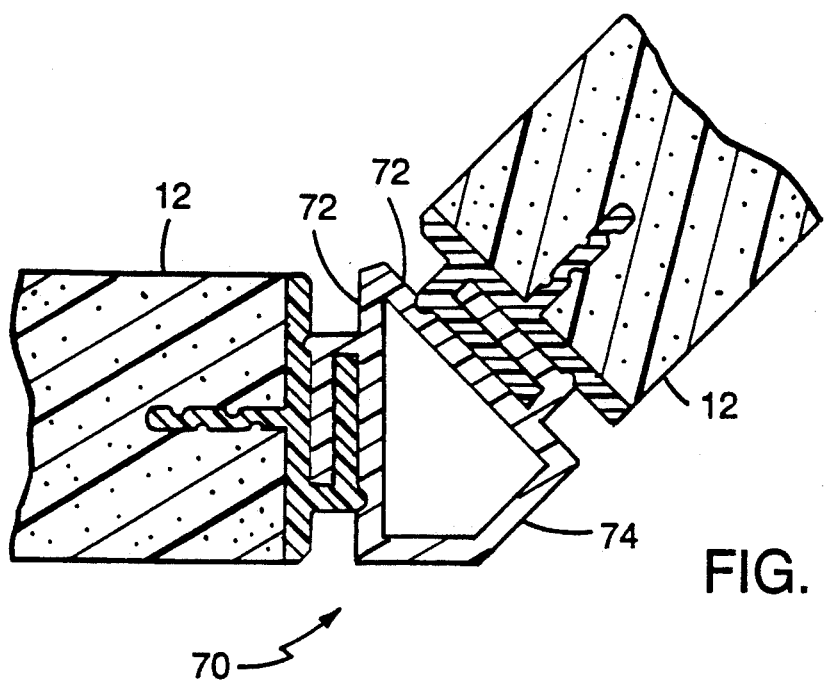
FIG. 5 is a sectional view of a panel system with panels arranged at 45° to one another.

In a similar manner, using appropriately designed connector posts, other panel arrangements can be formed. For example, referring to FIG. 5, a post 70, having two connectors 72 held apart at a 45° angle by a spacer 74, is used to join two panels 12 at an angle of 45°. Other angular connectors, e.g. 90° connectors, can likewise be employed.

Figure 6:
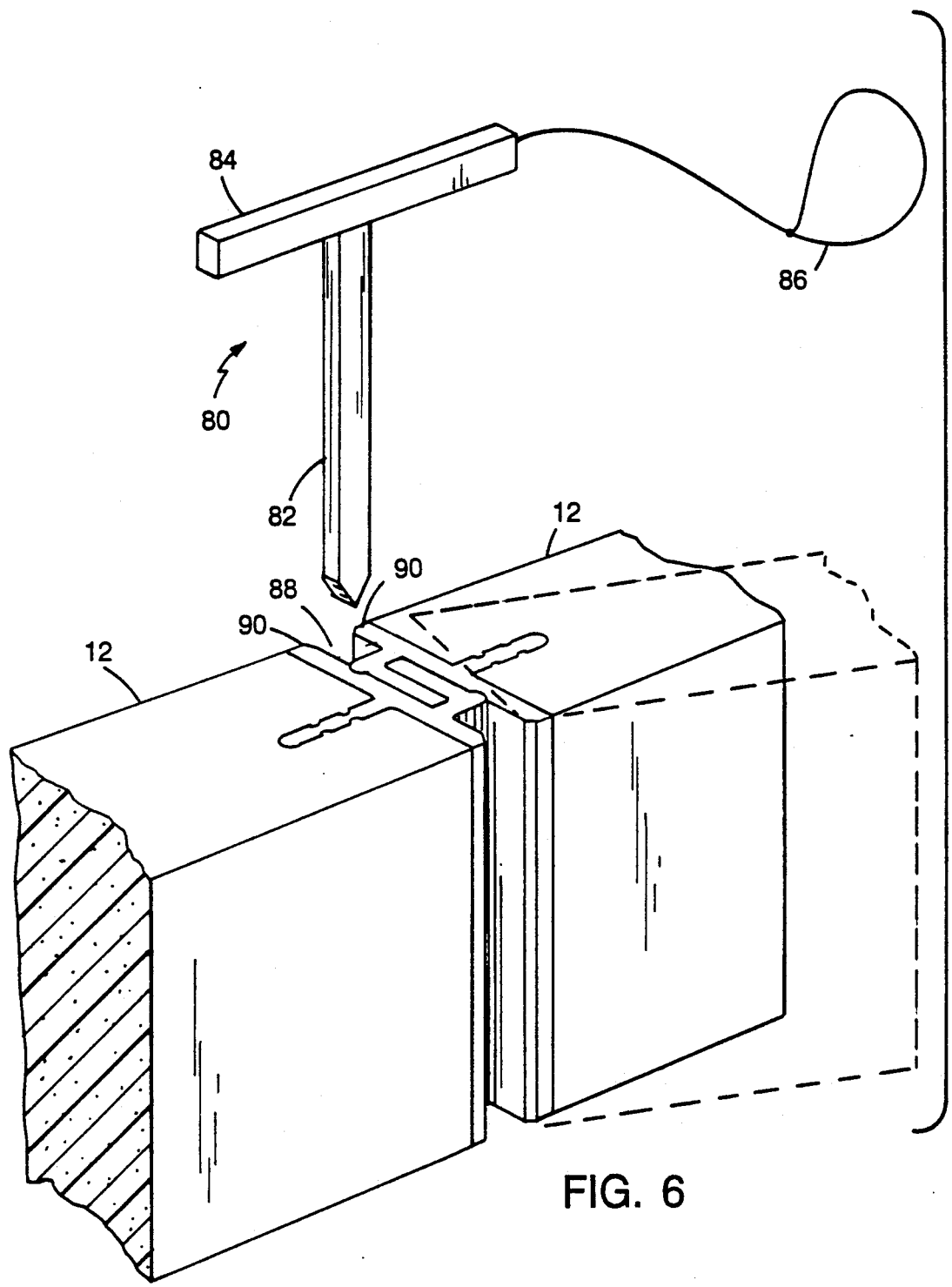
FIG. 6 is a perspective view of a panel system being disassembled and a tool used to aid disassembly.

As two individual connector strips interlock very securely, a specially designed releasing tool is used to disassemble panels so attached. Referring to FIG. 6, to release two attached connectors, tool 80, having a 0.281" wide shaft 82 tapered at its end, a handle 84, and a wrist strap 86, is inserted into the 0.25" wide space 88 between adjacent panels adjacent the interlocking connectors. As tool 80 is forced into space 88 parallel to the support wall of the adjacent connector, the ends 90 of the connectors are pushed apart to remove the adjacent bead from the groove of the connector. The panels 12 are then deflected out of the plane of alignment, as shown by the dotted line, and can be further disengaged manually.

Figure 7:
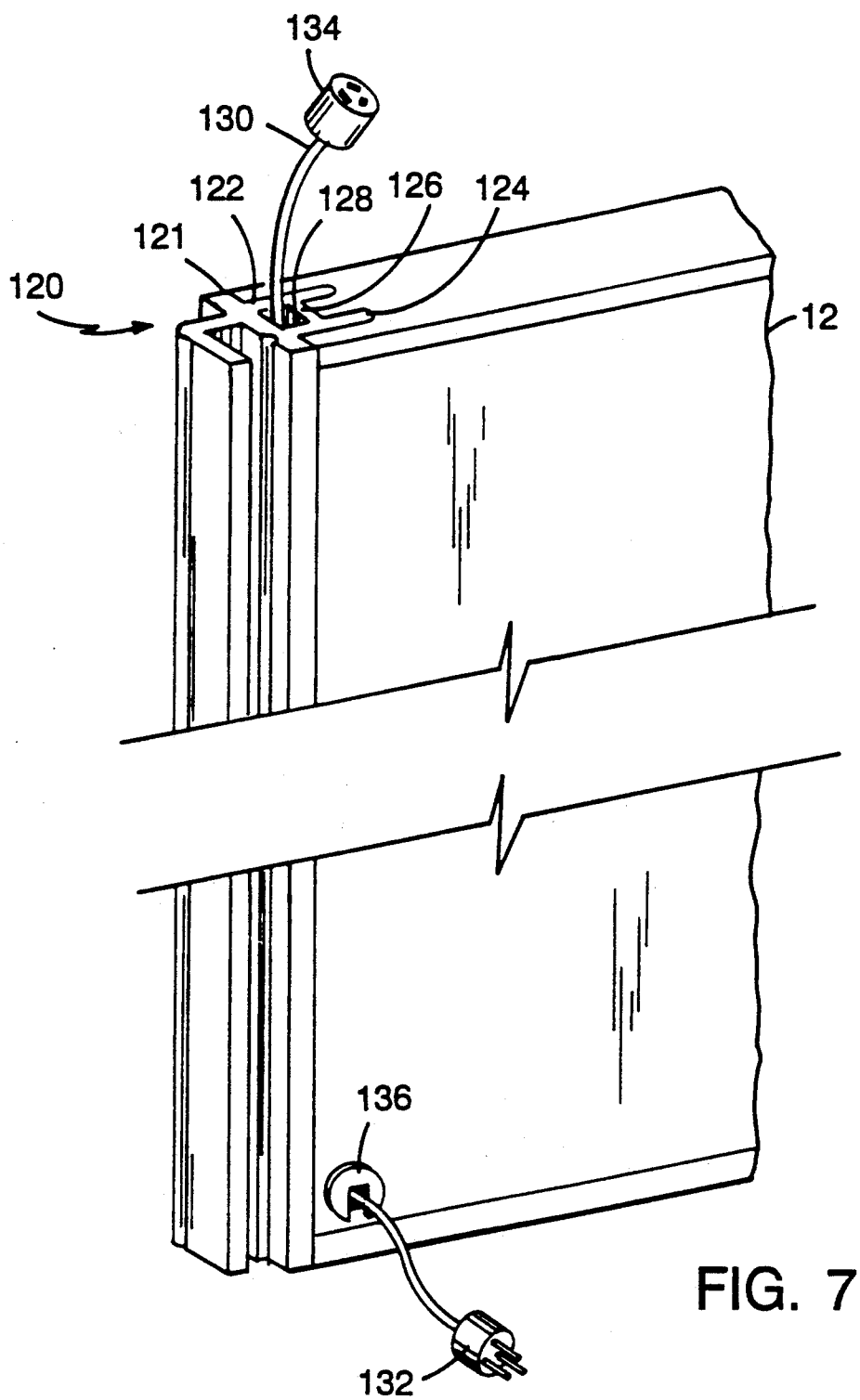
FIG. 7 is a partial perspective view of an alternate embodiment of a panel system according to the invention.

Referring to FIG. 7, a specially adapted connector strip 120, providing a conduit for supplying electricity on a panel for lights and other uses, has two legs 122, 124 extending into a panel 12. A crossbar 126, between legs 122, 124 and spaced from base 121, forms a hollow groove 128 running the length of the connector strip. An electrical cord 130, having a plug end 132 and a socket end 134, is inserted into groove 128 through a hole in panel 12 and a grommet 136.

Figure 8:
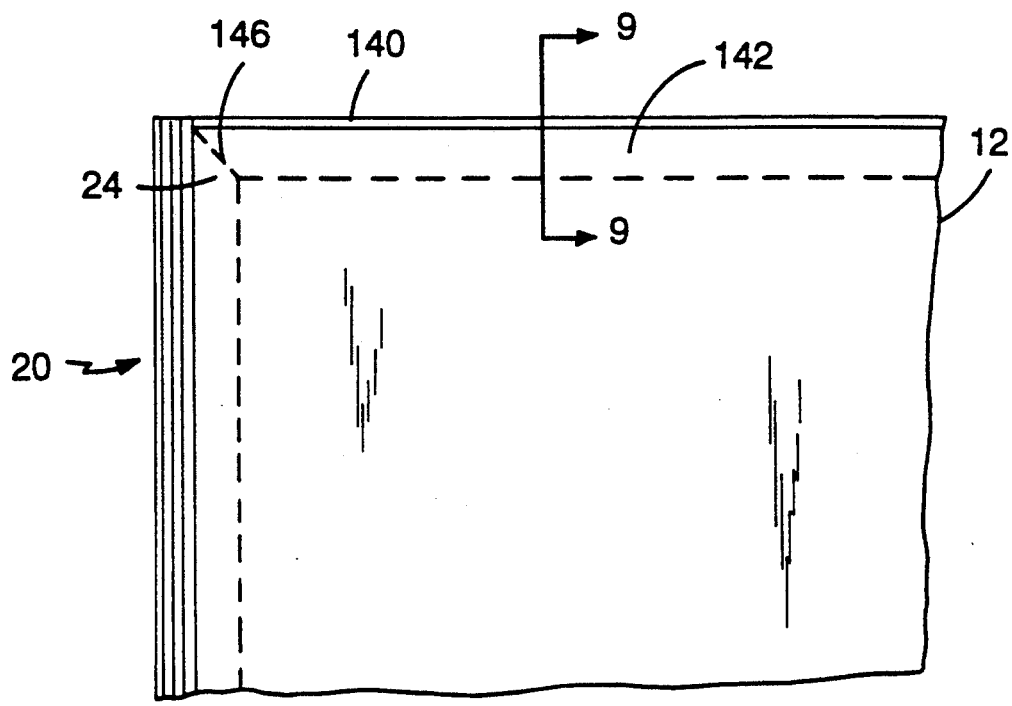
FIG. 8 is a partial side view of an alternate embodiment of a panel system according to the invention.
Figure 9:
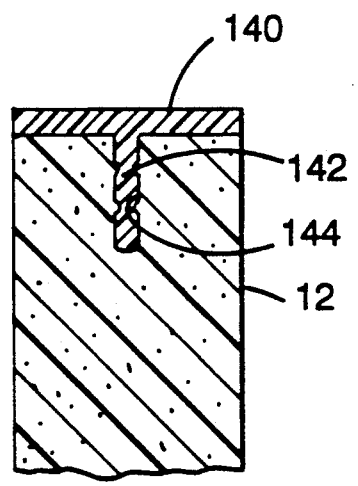
FIG. 9 is a sectional view taken at line 9—9 of FIG. 8.

Referring to FIGS. 8 and 9, in an alternative construction of a panel 12, a 0.031' thick styrene plastic cap 140, having a central leg 142 inserted in groove 144 in the top edge of the panel, provides top protection for the panel in place of a wooden strip. As indicated by the dotted lines in FIG. 8, recessed central leg 142 of the plastic cap 140 abuts the recessed leg 24 of edge connector 20 in a mitered joint 146. The cap 140 is secured to the panel by the same two part solventless epoxy resin as is utilized to secure the edge connector 20 to the panel 12. A similar cap may be used along the base of the panel.

Figure 10:
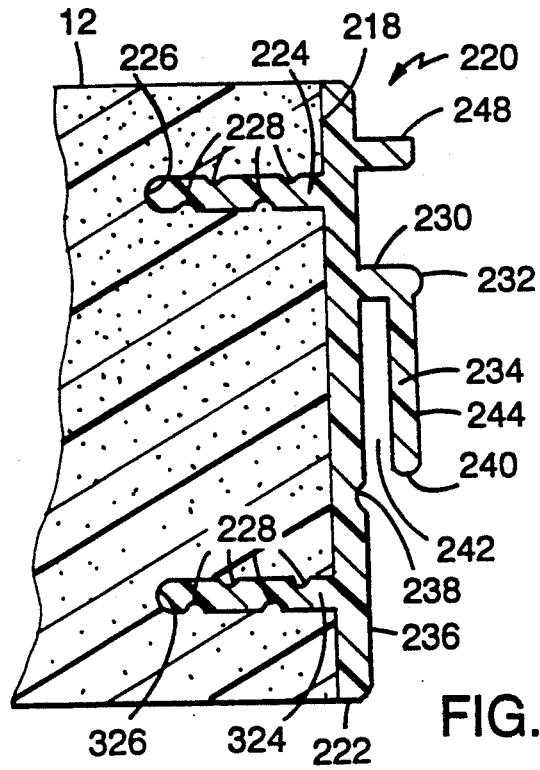
FIG. 10 is a sectional view of an alternate embodiment of a panel system according to the invention.
Figure 11:
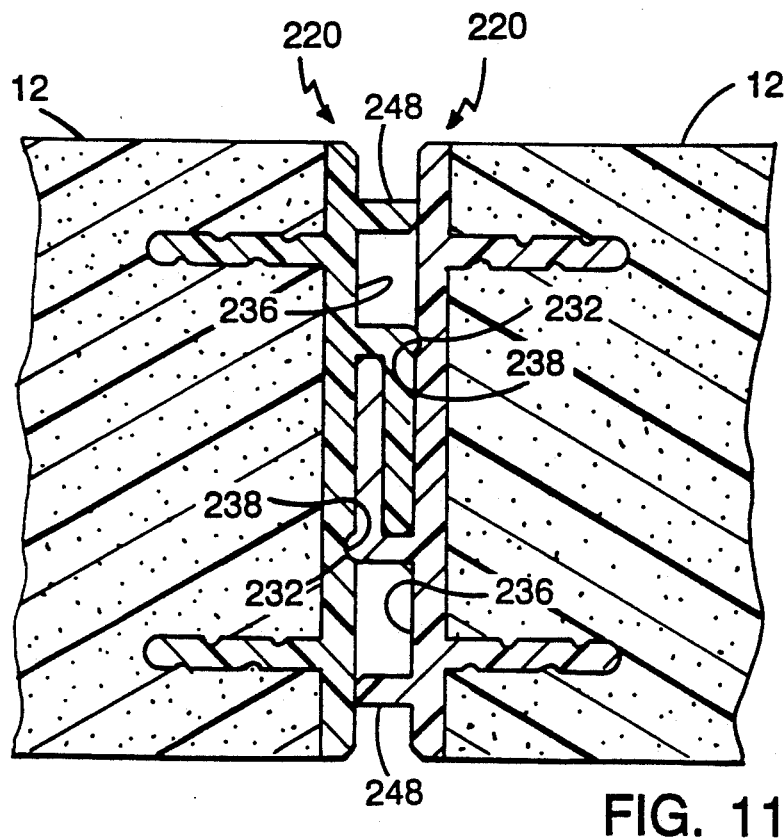
FIG. 11 is a sectional view of an alternate embodiment of a panel system according to the invention.

In another embodiment, an edge connector is adapted for use with a wider panel. Referring to FIGS. 10–11, connector 220, extending substantially the length of panel edge 218, has a 2.5" wide transverse base 222, with two integrally connected legs 224, 324 extending into panel grooves 226, 326. On the other side of the base from legs 224, 324, in a configuration similar to connector 20 (as shown in FIG. 2), support wall 230 (0.25" long), extending away from panel edge 218, is positioned between the transverse center of base 222 and one end of the base, with a 0.75" long integrally connected tongue 234 extending parallel to and centered on the base. At the end of support wall 230 is situated integrally connected bead 232, and in the surface 236 of base 222, facing towards tongue 234, is provided a recessed groove 238, positioned at a distance from the center of the tongue and, in the illustrated embodiment, from the center of the base equal to the distance of the bead 232 from the centers to receive a bead 232 on the support wall of an opposing connector. Connector 220 also contains an additional wall or bracing leg 248 (0.25" long) integrally connected to and extending from base 222 and positioned between support wall 230 and the closer end of the base, 0.25" from the base end. In the embodiment illustrated in FIGS. 10 and 11, the height of bracing leg 248 is equal to the distance between base 222 and the outer surface 244 of tongue 234.

Referring to FIG. 11, when two connectors 220 are engaged, so that each tongue 234 is seated in recess 242 of the opposing connector strip and each bead 232 is snapped into groove 238 in the base of the opposing connector, each bracing leg 248 comes to rest against the surface 236 of the opposing connector base to provide additional stability to the 2.5" wide panel system.

Figure 12:
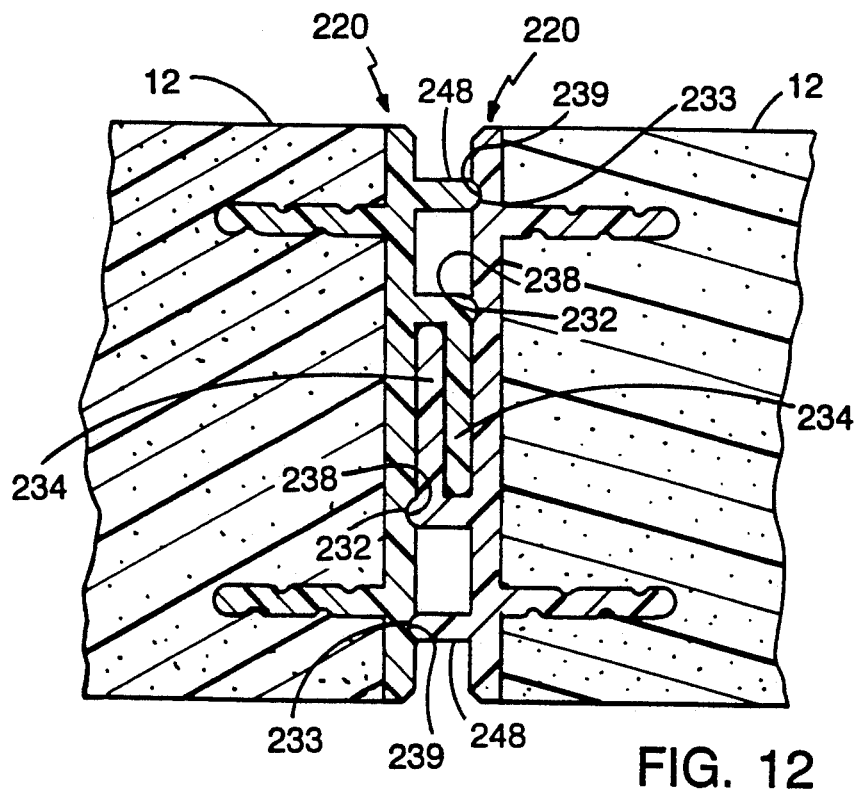
FIG. 12 is a sectional view of an alternate embodiment of a panel system according to the invention.

Referring to FIG. 12, in an alternate configuration, bracing leg 248 also has at is end a 0.031" integrally connected bead 233; and a grove 239 (0.031" deep) is provided in base surface 236, 0.25" from the other base end (on the other side of the transverse center of the base from bracing leg 248) to receive a bead 233 at the end of a bracing leg of an opposing connector 220. Groove 239 is positioned at a distance from the center of the base 222 and, in the illustrated embodiment, from the center of the tongue 234, equal to the distance of bracing leg 248 therefrom. In this configuration, two locking elements are provided for every connection. In yet another embodiment, illustrated in FIG. 13, the two tongues 234 on opposing connectors 220 may be friction fit, with the beaded bracing legs 248 (engaging grooves 239 on opposing connectors) providing the sole locking element.

Figure 13:
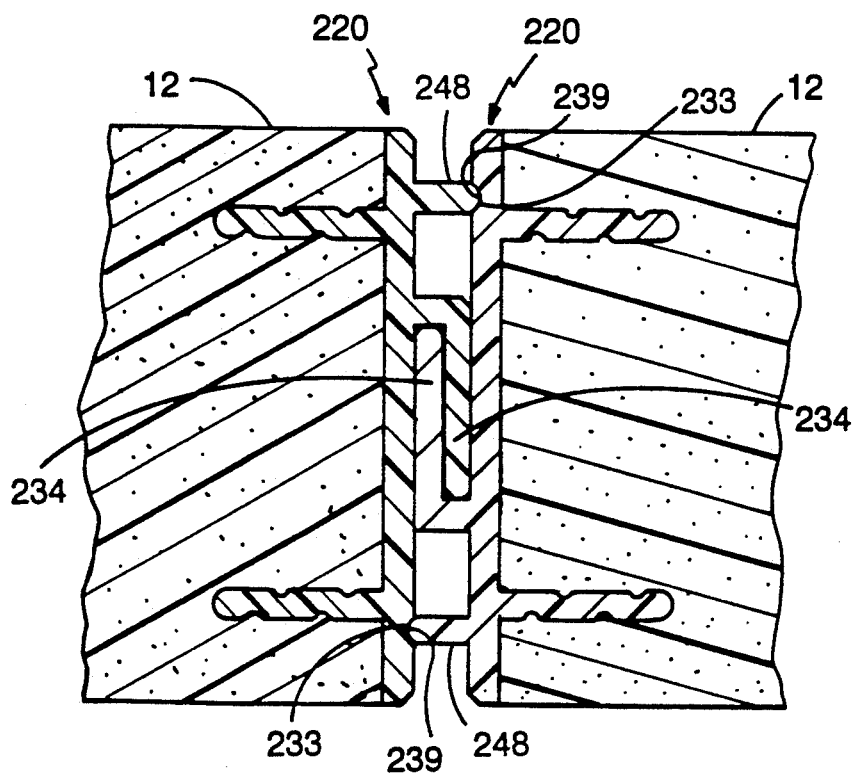
FIG. 13 is a sectional view of an alternate embodiment of a panel system according to the invention.
Figure 14:
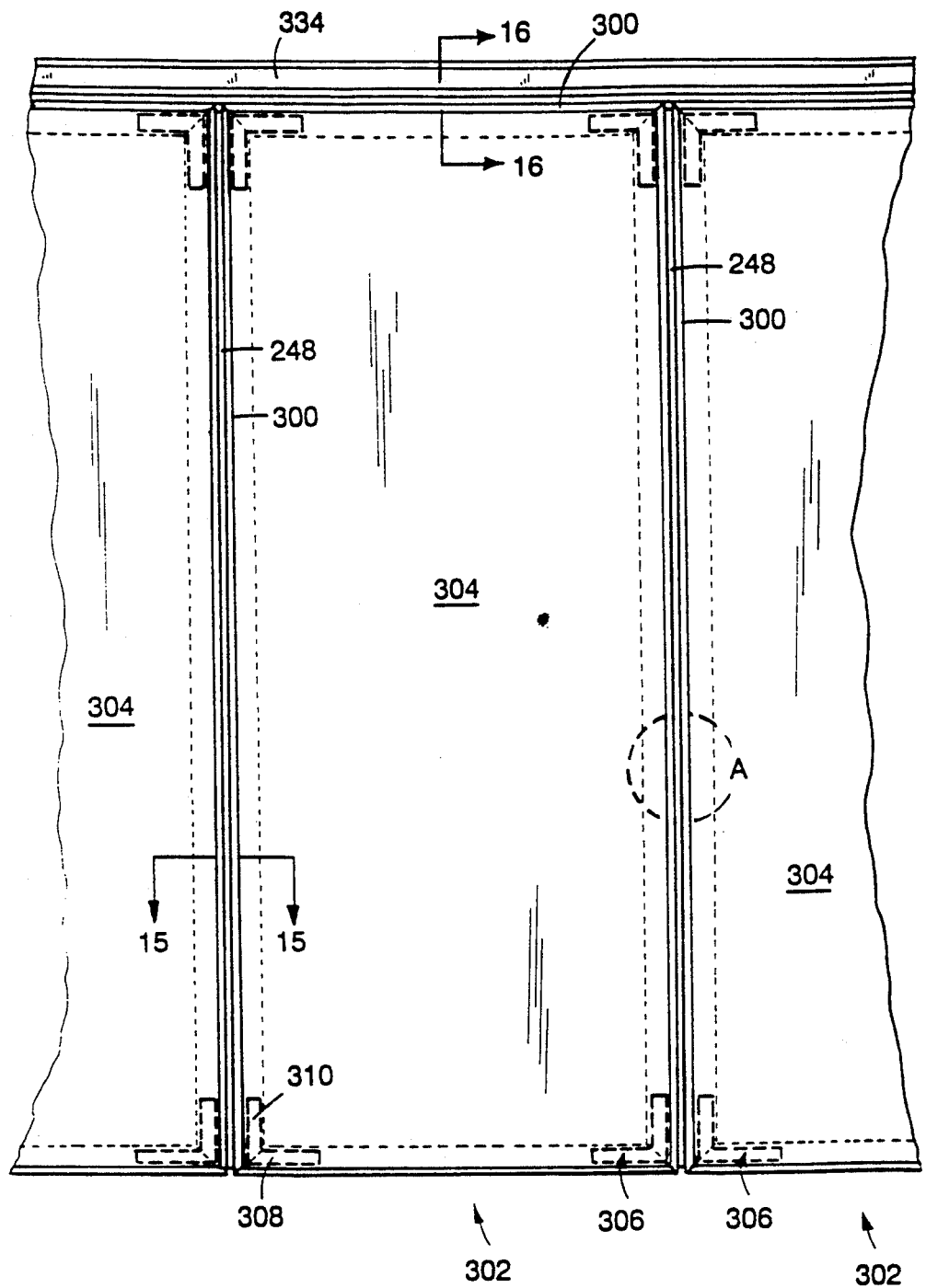
FIG. 14 is a front view of an alternate embodiment of a panel system according to the invention.
Figure 15:
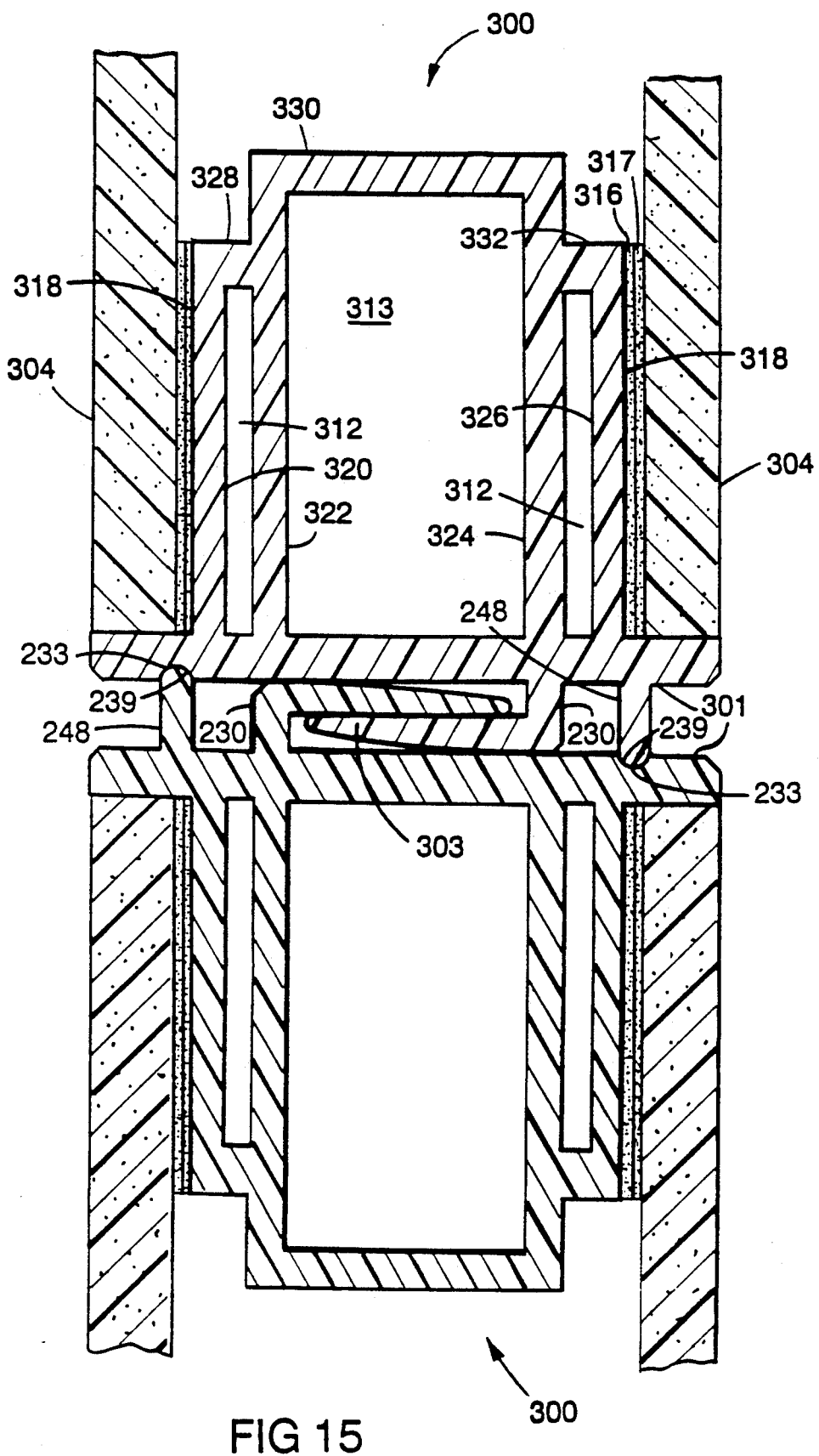
FIG. 15 is a sectional view of the panel system taken at line 15—15 of FIG. 14.
Figure 16:
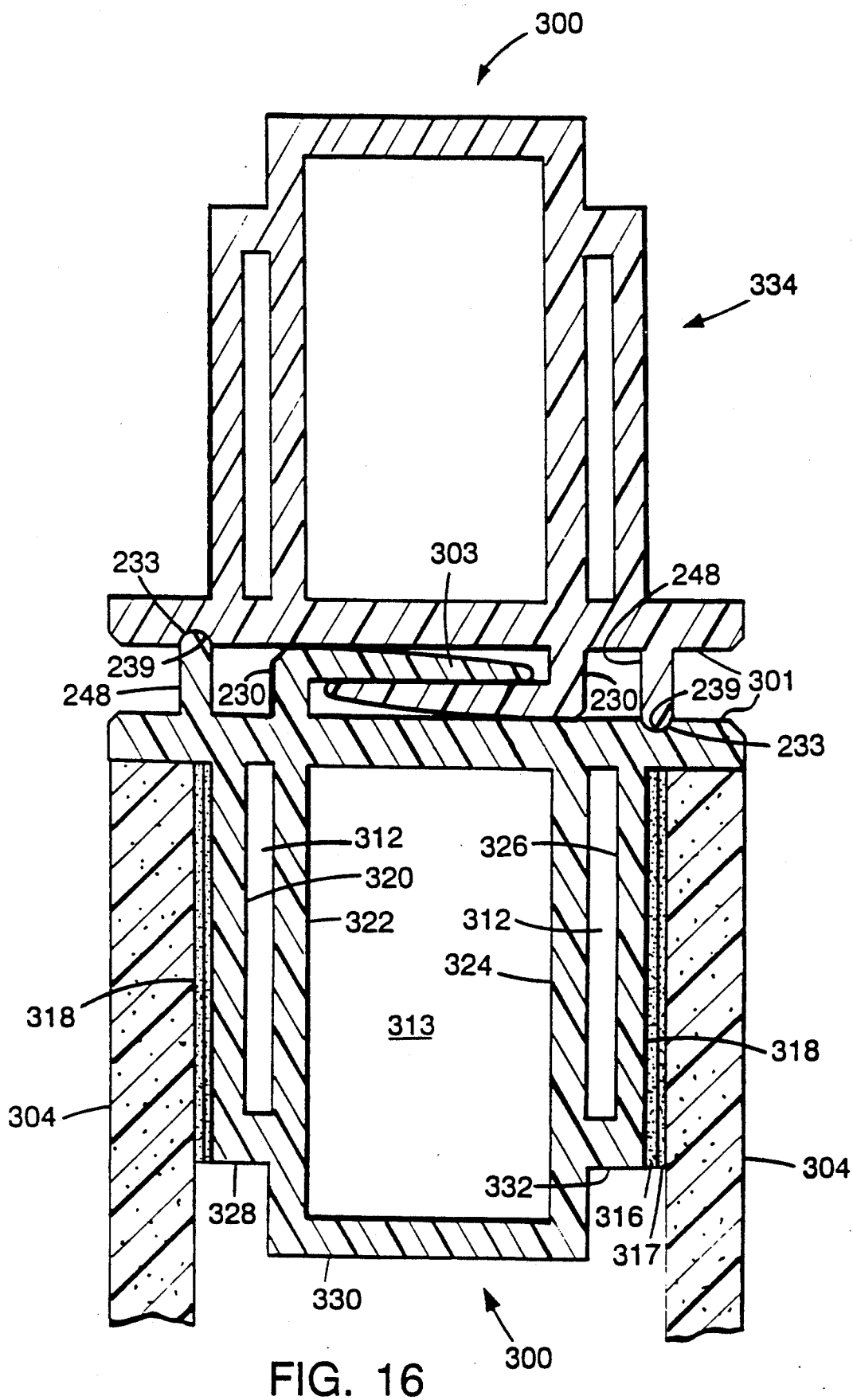
FIG. 16 is a sectional view of the panel system taken at line 16—16 of FIG. 14.

Referring to FIG. 14, in an alternate embodiment a plurality of frame members 300, having an edge connector structure, including base 301, similar to that shown in FIG. 13, are arranged to form a plurality of frames 302 for supporting and attaching panels 304. As illustrated in FIGS. 15 and 16, when the material employed is relatively rigid, e.g., polyvinylchloride, the tongues 303 are relieved on their outer sides, opposite base 301, to permit flexing during assembly and disassembly. Each frame member 300 is attached at its ends to two other frame members at an angle by a pair of angle members 306. The frame members are mitered at their ends where they are attached to one another. Each angle member 306 in the illustrated embodiment comprises perpendicularly arranged legs 308 and 310.

Referring to FIG. 15, the frame members 300 comprise elongated extrusions having, on the side opposite the edge connector structure, a tubular structure comprising a center channel 313 and on each side thereof tubular pockets 312 dimensioned to receive therein the legs 308, 310 of angle members 306. The tube structure is formed by tube walls 320, 322, 324, 326 extending from the connector base 301 and end walls 328, 330, 332. Each leg of angle member 306 fits into a pocket 312 of a respective frame member, maintaining the two frame members rigidly at a right angle to each other. While a single pocket, receiving a single angle member, may be utilized, the double pocket structure shown is generally preferred. It is also preferred that an open channel 313 be provided between the pockets, as shown. This channel may be used to run power cords and the like through the frame member. To permanently secure the frame members together in the frame configuration, adhesive may be applied to each angle iron prior to its insertion into the pockets.

Figure 14A:
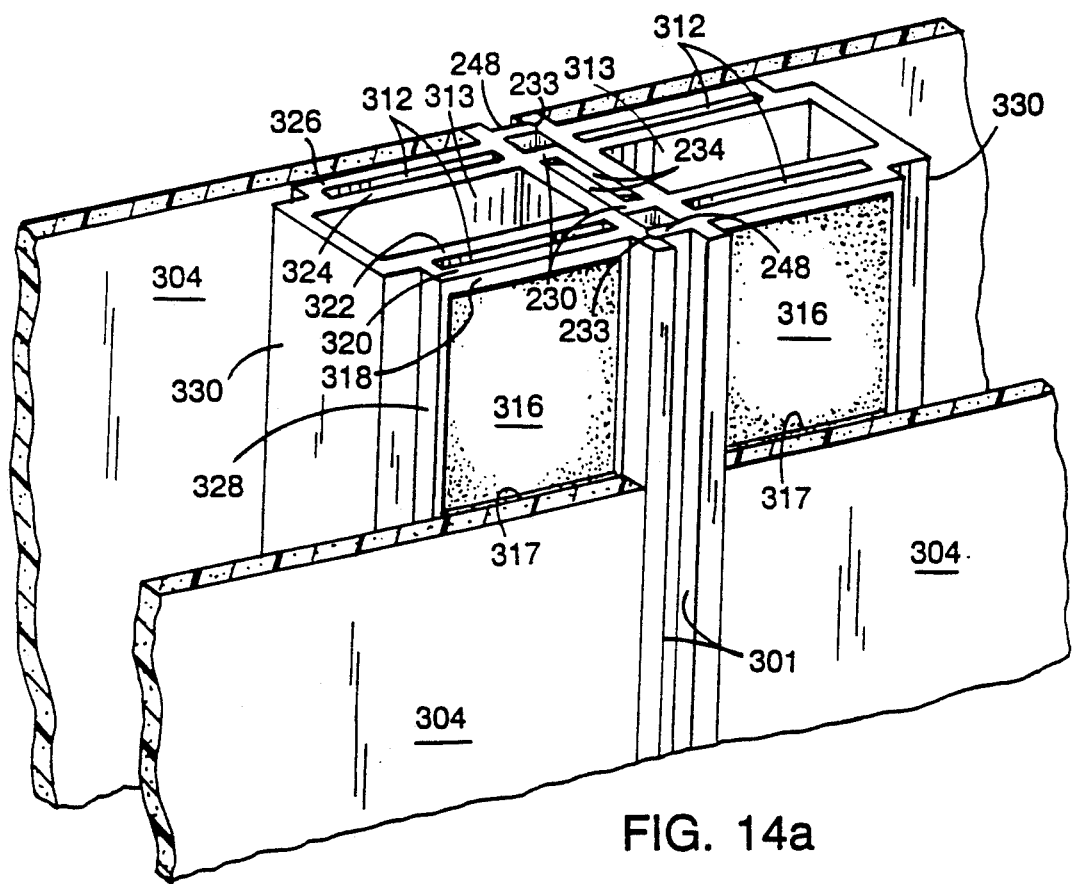
FIG. 14a is an enlarged perspective view of detail A of FIG. 14.

After the frames are assembled, structural members or panels 304 are attached to each frame. In a preferred embodiment, shown in FIG. 15 and in detail in FIG. 14a, hook and loop fastener 316, 317, e.g. VELCRO®, fabric, is adhered to the panels and to inset surfaces 318 on the sides of pockets 311, 312 of the frame members, which is in the plane of the frame. Advantageously, panels 304 can be readily removed and replaced as desired, and may comprise any suitable material. Preferred materials are expanded plastic, e.g. expanded polyvinyl chloride, and masonite. Angle members 306 may be formed of any rigid material having adequate strength to support the frame; aluminum is preferred for a combination of strength and light weight.

Referring to FIGS. 14 and 16, in a series of connected frames having horizontally arranged frame members along the tops thereof, it is preferred that a continuous frame member 334, having a length equal to the total length of the connected structural members, be mated with the top frame members of each frame. The use of the continuous connector assembly in this manner provides the assembled structure with additional stability and rigidity.

Although the connector structure shown in FIGS. 14 and 15 is similar to that shown in FIG. 13, the frame aspect of the invention illustrated in FIGS. 14 and 15 may be practiced with any of the other types of connectors illustrated hereinabove, or other similar connectors.

Use

The panels can be assembled in any desired arrangement, e.g., as room dividers or as a backdrop for a display at a trade show. They are lightweight and yet the system is sturdy, with the connector strips holding the panels securely together.

Other embodiments are within the following claims. For example, the panels can be of a variety of sizes, can be made of any other kind of convenient material, such as wood or corrugated cardboard, and can be finished with any kind of surface material, e.g., cloth. The connector strips can also be made of resilient metal and can be interlocked by friction fit rather than by a bead and groove arrangement as described. Extrusion lengths can be varied as desired for panels of different heights. With stronger panel material and the appropriately oriented connector, the panel system can be used to form support systems or containers.

What is claimed is:

1. A frame member for assembly into a frame and for connecting adjacent frame members comprising:
    an elongated tubular member comprising a base forming one wall thereof, said base extending transversely between edges of said base,
    a support wall integral with said base extending outwardly from said base on one side thereof away from said tubular member, said support wall extending generally parallel to said base edges and positioned between the transverse center of said base and one edge of said base;
    a tongue integrally connected at one end to said support wall and extending to a free end thereof spaced away from said base and positioned between the transverse center of said base and the other edge of said base, said tongue and said base defining a recess therebetween to receive a tongue of a mating frame member;
    at least one detent or groove in said one side of said base positioned between said free end of said tongue and said other edge of said base;
    at least one bead or protrusion connected to said base on said one side thereof at a distance from the transverse center thereof equal to the distance of said detent or groove from said transverse center and extending from said base a distance greater than the distance of the outer surface of the tongue therefrom;
    a plurality of tube walls extending from said base on the other side thereof and at least one end wall spaced from said base and extending between said tube walls and together therewith and with said base defining at least a pair of parallel tubes, one of said tubes dimensioned to receive an angle member therein for attaching frame members together to form a frame.

2. The frame member claimed in claim 1 wherein said tube walls, said base and said end wall define three tubes comprising a center channel and on each side thereof a pocket dimensioned for receiving an angle member.

3. The frame member claimed in claim 1 wherein hook or loop fabric fastener is positioned on at least one of the outer surfaces of the outer tube walls.

4. The frame member claimed in claim 1 wherein the ones of said tube walls are inset from the edge of said base.

5. The frame member claimed in claim 4 wherein said tube walls, said base and said end wall define three tubes comprising a center channel and on each side thereof a pocket dimensioned for receiving an angle member.

6. The frame member claimed in claim 5 wherein hook or loop fabric fastener is positioned on at least one of the outer surfaces of the outer tube walls.

7. The system of any of claims 1-6 wherein said base further comprises a bracing leg integral with said base and extending from said base between said support wall and said one edge of said base, generally parallel with said support wall.

8. The system of claim 7 wherein said bracing wall has a height above said base equal to the distance between said base and the outer surface of said tongue facing away from said base.

9. The system of claim 8 wherein one said bead or protrusion extends from the end of said bracing leg away from said base beyond the outer surface of said tongue.

10. The system of claim 9 wherein one said detent or groove in said base is positioned between said free end of said tongue and said other edge of said base at a distance from the center of said base equal to the distance of said bracing leg from the center of said base.

11. The system of claim 1 wherein a mounting surfaces extend in the plane of said frame on the side of said bases opposite said support walls for receiving and mounting a panel thereon.

12. The system claimed in claim 11 further comprising a panel, said panel and said mounting surfaces having connected thereto, respectively, hook on loop fabric fasteners removably securing said panel to said mounting surfaces.

13. The system of claim 12 wherein said system comprises a plurality of adjacent frames and the adjacent frame members of adjacent frames each comprise edge connector members connected together.

14. The system of claim 13 wherein said system comprises frames having top, bottom, and side frame members, said top frame members comprising edge connector members, and a continuous frame member comprising an edge connector member extends the length of the connected frames and is connected to the top frame members of said frames.

15. A frame system for supporting panels and for connecting frames at their adjacent edges, comprising:
    a plurality of frame members, each attached to at least two other frame members, arranged to form a frame, each frame member having at least one panel mounting surface for mounting a panel to and supporting said panel on said frame and at least one of said frame members being an edge connector member, comprising:
    a base extending transversely between edges of said base;
    a support wall integral with said base extending outwardly away from said base on one side thereof, opposite the interior of said frame, said support wall extending generally parallel to said base edges and being positioned between the transverse center of said base and one edge of said base;
    a tongue integrally connected at one end to said support wall and extending from said support wall to a free end thereof spaced away from said base and positioned between the transverse center of said base and the other edge of said base, said tongue and said base defining a recess therebetween to receive a tongue of a mating frame member;

at least one detent or groove in said one side of said base positioned between said free end of said tongue and said other edge of said base; and at least one bead or protrusion connected to said base on said one side thereof at a distance from the transverse center of said base equal to the distance of said detent or groove from said transverse center and extending from said base a distance greater than the distance of the outer surface of said tongue therefrom.

16. The system of claim 15 wherein said system comprises a plurality of adjacent frames and the adjacent frame members of adjacent frames each comprise edge connector members connected together.

17. The system of claim 16 wherein said system comprises frames having top, bottom and side frame members, said top frame members comprising edge connector members, and a continuous frame member comprising an edge connector member extends the length of the connected frames and is connected to the top frame members of said frames.

18. The system of any of claims 11–17 wherein each frame member comprises a tubular structure defining a pocket on the side of said base opposite the support wall, angle members each having a pair of angularly disposed legs are positioned at the point of attachment of each pair of frame members with one leg in the pocket of each such frame member thereby attaching said frame members together, said pockets each being dimensioned to receive one of said legs.

19. The system of claim 18 wherein the corner of each frame member comprises a pair of said pockets and a pair of said angle members are positioned at the point of attachment of each pair of frame members with one leg of each in one of the pockets of each such frame member.

20. The system of claim 19 wherein each angle is disposed in a plane substantially parallel to the plane of the other angle member of each plane.

21. The system of claim 19 wherein said frame member comprises an elongated extrusion, said base edges, support wall, pockets and tongue extending along the length of said extrusion, and said pockets being spaced to form a tubular channel therebetween.

22. The system of claim 15 wherein said base further comprises a bracing wall integral with said base and extending from said base between said support wall and said one edge of said base, generally parallel with said support wall.

23. The system of claim 22 wherein said bracing wall has a height above said base equal to the distance between said base and the outer surface of said tongue facing away from said base.

24. The system of claim 23 wherein one said bead or protrusion extends from the end of said bracing wall away from said base beyond the outer surface of said tongue.

25. The system of claim 24 wherein one said detent or groove in said base is positioned between said free end of said tongue and said other edge of said base at a distance from the center of said base equal to the distance of said bracing wall from the center of said base.

* * * * *

UNITED STATES PATENT AND TRADEMARK OFFICE
CERTIFICATE OF CORRECTION

PATENT NO. : 5,305,567

DATED : Apr. 26, 1994

INVENTOR(S) : Wittler

It is certified that error appears in the above-identified patent and that said Letters Patent is hereby corrected as shown below:

Col. 5, line 11, insert --wall of the groove and exits the panel near its base through-- before "a grommet 136."

Col. 7, line 68, delete "outer" (2nd occurrence).

Col. 8, line 2, delete "ones" and insert --outer surfaces-- in its place.

Signed and Sealed this

Tenth Day of September, 1996

Attest:

BRUCE LEHMAN

*Attesting Officer*  *Commissioner of Patents and Trademarks*